United States Patent
Mueller et al.

(10) Patent No.: US 12,134,320 B2
(45) Date of Patent: Nov. 5, 2024

(54) METHOD FOR HEATING A MOTOR VEHICLE

(71) Applicant: Dr. Ing. h.c. F. Porsche Aktiengesellschaft, Stuttgart (DE)

(72) Inventors: Kai Soeren Mueller, Stuttgart (DE); Johannes Wende, Heilbronn (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 160 days.

(21) Appl. No.: 17/695,858

(22) Filed: Mar. 16, 2022

(65) Prior Publication Data
US 2022/0305921 A1    Sep. 29, 2022

(30) Foreign Application Priority Data
Mar. 23, 2021 (DE) .................. 10 2021 107 091.0

(51) Int. Cl.
*B60L 15/20* (2006.01)
*B60H 1/00* (2006.01)
(Continued)

(52) U.S. Cl.
CPC .......... *B60L 15/20* (2013.01); *B60H 1/00642* (2013.01); *B60L 53/22* (2019.02);
(Continued)

(58) Field of Classification Search
CPC .......... B60L 15/20; B60L 58/27; B60L 53/22; H02P 21/22; H02P 27/08; B60H 1/00642
(Continued)

(56) References Cited

U.S. PATENT DOCUMENTS 10,284,133 B2 * 5/2019 Yagi ................. F25B 31/02
2012/0090905 A1   4/2012 Vollmer et al.
(Continued)

FOREIGN PATENT DOCUMENTS

CN   111347939 A   6/2020
CN   111865183 A   10/2020
(Continued)

OTHER PUBLICATIONS

Che et al. (CN 111376795 A) "For Control Method of Heating Electric Automobile Battery, System and Electric Vehicle" (Year: 2020).*

(Continued)

*Primary Examiner* — Jorge L Carrasquillo
(74) *Attorney, Agent, or Firm* — LEYDIG, VOIT & MAYER, LTD.

(57) ABSTRACT

A method for heating a motor vehicle having a three-phase electric motor as a traction motor includes providing a pulse-controlled inverter for supplying power to the electric motor and providing a coolant circuit for cooling the electric motor and the pulse-controlled inverter using coolant, the coolant circuit using the coolant to supply heat to a heat exchanger for heating a passenger compartment and/or a vehicle battery, wherein when the electric motor is stationary, a positive d current and/or negative d current is controlled in a d-axis, with the result that heat loss is generated, the heat loss being introduced into the coolant.

8 Claims, 5 Drawing Sheets

(51) Int. Cl.
  *B60L 53/22* (2019.01)
  *B60L 58/27* (2019.01)
  *H02P 21/22* (2016.01)
  *H02P 27/08* (2006.01)
(52) U.S. Cl.
  CPC .............. *B60L 58/27* (2019.02); *H02P 21/22* (2016.02); *H02P 27/08* (2013.01)
(58) Field of Classification Search
  USPC ........................................................ 318/504
  See application file for complete search history.

(56) References Cited

U.S. PATENT DOCUMENTS

| | | | | |
|---|---|---|---|---|
| 2012/0200241 | A1* | 8/2012 | Kojima | B60L 58/25 318/139 |
| 2015/0217622 | A1* | 8/2015 | Enomoto | F16K 11/076 62/244 |
| 2019/0016194 | A1* | 1/2019 | Hartmann | B60W 20/00 |
| 2022/0077518 | A1* | 3/2022 | Ling | H01M 10/625 |

FOREIGN PATENT DOCUMENTS

| | | |
|---|---|---|
| CN | 111865185 A | 10/2020 |
| CN | 112297749 A | 2/2021 |
| CN | 112297868 A | 2/2021 |
| DE | 102009000204 A1 | 7/2010 |
| DE | 102012224071 A1 | 6/2014 |
| JP | 2001197607 A | 7/2001 |
| WO | WO 2017166092 A1 | 10/2017 |
| WO | WO 2020125769 A1 | 6/2020 |

OTHER PUBLICATIONS

Ling et al. (CN 111354999 A) "A Vehicle and Its Power Battery Heating Device and Method" Date Published Jun. 30, 2020 (Year: 2020).*

Liu et al. (CN 103383433 A) The State Monitoring and Fault Early Warning Method for Ship Generator Stator Core Date Published Nov. 6, 2013 (Year: 2013).*

* cited by examiner

METHOD FOR HEATING A MOTOR VEHICLE

CROSS REFERENCE TO RELATED APPLICATIONS

This application claims benefit to German Patent Application No. DE 10 2021 107 091.0, filed on Mar. 23, 2021, which is hereby incorporated by reference herein.

FIELD

The invention relates to a method for heating a motor vehicle.

BACKGROUND

Motor vehicles comprising an internal combustion engine generate enough waste heat, when the internal combustion engine is running, to be able to heat the passenger compartment and/or the vehicle battery. These possibilities are not available in motor vehicles comprising an electric motor as traction motor. However, the electric motor and the associated power electronics can also generate waste heat, which can be used to heat the passenger compartment and/or the vehicle battery via a coolant circuit. This heat source is thus not available when the motor vehicle is stationary since, when the electric motor is at a standstill, it accordingly does not generate any heat.

SUMMARY

In an embodiment, the present disclosure provides a method for heating a motor vehicle comprising a three-phase electric motor as a traction motor, the method comprising providing a pulse-controlled inverter for supplying power to the electric motor, and providing a coolant circuit for cooling the electric motor and the pulse-controlled inverter using coolant, the coolant circuit using the coolant to supply heat to a heat exchanger for heating a passenger compartment and/or a vehicle battery, wherein when the electric motor is stationary, a positive d current and/or negative d current is controlled in a d-axis, with the result that heat loss is generated, the heat loss being introduced into the coolant.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In some embodiments of the present invention, a method is provided for heating a motor vehicle comprising an electric motor as traction motor, which method allows the passenger compartment and/or the vehicle battery to be heated even when the motor vehicle is stationary.

One exemplary embodiment of the invention relates to a method for heating a motor vehicle comprising a three-phase electric motor as traction motor, wherein a pulse-controlled inverter is provided for supplying power to the electric motor, wherein a coolant circuit is provided for cooling the electric motor and the pulse-controlled inverter using coolant, said coolant circuit using the coolant to supply heat to a heat exchanger for heating the passenger compartment and/or to the vehicle battery, wherein when the electric motor is stationary, a positive d current and/or negative d current is controlled in the d-axis, with the result that heat loss is generated, said heat loss being introduced into the coolant. As a result, current can be fed to the electric motor without a motor vehicle drive torque which propels the motor vehicle being produced. The current feed nonetheless results in heat loss being generated, said heat loss being introduced into a coolant which can be used for heating. Thus, the provided electric motor can be used as a heat source by using a targeted current feed even though the electric motor is not propelling the motor vehicle in this operating mode.

In one exemplary embodiment, it is also advantageous for the electric motor to be supplied with the d current in the d-axis and to generate heat loss, which is used as waste heat, both in the electric motor and in the pulse-controlled inverter, wherein the q current in the q-axis is equal to zero. Propulsion occurs only as a result of generating a torque on the basis of a q current. The d current without any q current therefore does not propel the motor vehicle and nonetheless generates heat loss. The terms "d current" and "q current" derive from consideration in terms of d/q coordinates in order to describe a three-phase electric motor on the basis of a d/q transformation. The d/q transformation generally serves to transfer three-phase values as in the case of a three-phase electric motor, also known as a three-phase machine, with the axes U, V, W to a two-axis coordinate system with the axes d and q.

In a further exemplary embodiment, it is expedient if as a result of the d current being set, no torque that could propel the motor vehicle is applied to the wheels of the motor vehicle. Power loss is thus induced without the motor vehicle having to be moved.

It is also advantageous for the heat loss from the electric motor to be generated as power losses from the winding of the electric motor and/or as eddy current losses in laminations and/or for the heat loss in the pulse-controlled inverter to be generated as on-state losses from the power switches and freewheeling diodes and/or as switching losses when the power switches are switched and/or line losses and/or losses in the DC-link capacitor during operation of the power switches.

Furthermore, it is also advantageous for the pulse-controlled inverter to have an electronic circuit comprising power switches and freewheeling diodes, wherein the current through the power switches and the freewheeling diodes is modulated. The desired d current can thus be temporally modulated in order to achieve suitable heating and not to damage the electric motor.

It is also advantageous for the pulse-controlled inverter to have high-side power transistors, low-side power transistors, low-side diodes and high-side diodes, wherein the current through the high-side power transistors and the low-side diodes is controlled in a modulated manner and/or wherein the current through the low-side power transistors and the high-side diodes is controlled in a modulated manner. This respective modulation allows heating to be achieved with a defined current feed, without the electric motor being damaged.

It is preferable for the current through the power transistors and diodes to be pulse-modulated, in particular with a square-wave signal having a constant amplitude or a modulated amplitude. This respective modulation allows heating to be achieved with a defined current feed, without the electric motor being damaged.

Figure 1:
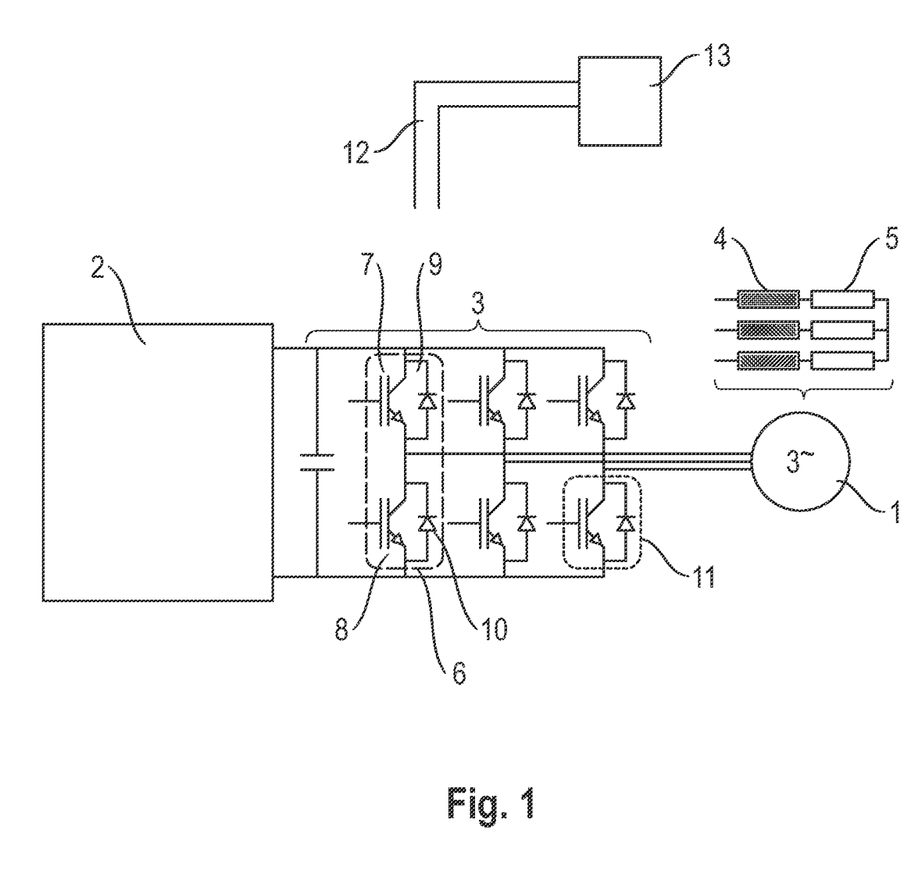
FIG. 1 shows a schematic depiction of an interconnection of an electric motor with a pulse-controlled inverter for illustrating a method according to the invention.

FIG. 1 schematically shows an electric motor 1 as a three-phase machine, which is supplied with current by a high-voltage vehicle electrical system 2 and a pulse-controlled inverter 3. For this purpose, the three individual phases of the electric motor 1 can be supplied with current I in a separately controlled manner.

In this case, the electric motor 1 has resistive components which can be inductive or ohmic; see reference signs 4 and 5.

The current through the electric motor 1 with its three phases can be depicted in a three-dimensional coordinate system, such that the currents $I_U$, $I_V$ and $I_W$ can be depicted. A d/q transformation also makes it possible to employ a depiction with currents $I_d$ and $I_q$.

The pulse-controlled inverter 3 has power switch modules 6, which are equipped with high-side power switches 7, low-side power switches 8, high-side diodes 9 and low-side diodes 10. In this case, the power switches may be in the form of MOSFET power switches or, as shown in FIG. 1, IGBT power switches 11. In this case, the diode is integrated into the IGBT power switch 11. A power switch module 6 can consist herein of two IGBT power switches 11.

In this case, the torque M of the electric motor 1 has a plurality of terms. In one term, the respective torque component of M is proportional to $I_d*I_q$, and in the other term, the torque component is proportional to $I_q$. This means that when $I_q$=0, no torque M is transmitted. However, in this case, $I_d$ may be non-zero, with the result that heat loss is induced.

$$M \sim A*I_d*I_q + B*I_q$$

where the factors A and B are proportional to the number of pole pairs p, the flux F of the permanent magnets and/or the secant inductance S in the d/q-axis, with $$A=3/2*p*(S_{s,d}-S_{s,q}) \text{ and } B=3/2*p*F.$$

Accordingly, heating while the motor vehicle is at a standstill can be used at operating points at which $I_q$=0.

Therefore, the method according to the invention for heating a motor vehicle comprising a three-phase electric motor 1 as traction motor provides the following approach, wherein a pulse-controlled inverter 3 is provided for supplying power to the electric motor 1, wherein a coolant circuit 12 is provided for cooling the electric motor 1 and the pulse-controlled inverter 3 using coolant, said coolant circuit using the coolant to supply heat to a heat exchanger for heating the passenger compartment and/or to the vehicle battery 13. In this case, the vehicle battery 13 is part of the high-voltage vehicle electrical system 2.

When the electric motor 1 is stationary, a positive d current and/or negative d current is controlled in the d-axis, with the result that heat loss is generated, said heat loss being introduced into the coolant. This then allows the vehicle battery 13 and/or the passenger compartment to be heated.

In this case, the electric motor 1 is supplied with the d current in the d-axis and heat loss, which is used as waste heat, is generated both in the electric motor and in the pulse-controlled inverter, wherein the q current in the q-axis is equal to zero. In this case, setting the d current to zero ensures that no torque that could propel the motor vehicle is applied to the wheels of the motor vehicle.

The heat loss from the electric motor 1 occurs as power losses from the winding of the electric motor 1 and/or as eddy current losses in laminations and/or the heat loss in the pulse-controlled inverter 3 occurs as on-state losses from the power switches 7, 8 and freewheeling diodes and/or as switching losses when the power switches 7, 8 are switched and/or line losses and/or losses in the DC-link capacitor during operation of the power switches 7, 8.

According to FIG. 1, the pulse-controlled inverter 3 has an electronic circuit comprising power switches 7, 8 and freewheeling diodes 9, 10, wherein the current through the power switches 7, 8 and the freewheeling diodes 9, 10 is modulated.

In the exemplary embodiment shown, the pulse-controlled inverter 3 has high-side power transistors 7, low-side power transistors 8, high-side diodes 9 and low-side diodes 10, wherein the current through the high-side power transistors 7 and the low-side diodes 10 is controlled in a modulated manner and/or wherein the current through the low-side power transistors 8 and the high-side diodes 9 is controlled in a modulated manner.

In this case, the current through the power transistors 7, 8 and diodes 9, 10 can be pulse-modulated, in some embodiments with a square-wave signal having a constant amplitude or a modulated amplitude.

Figure 2:
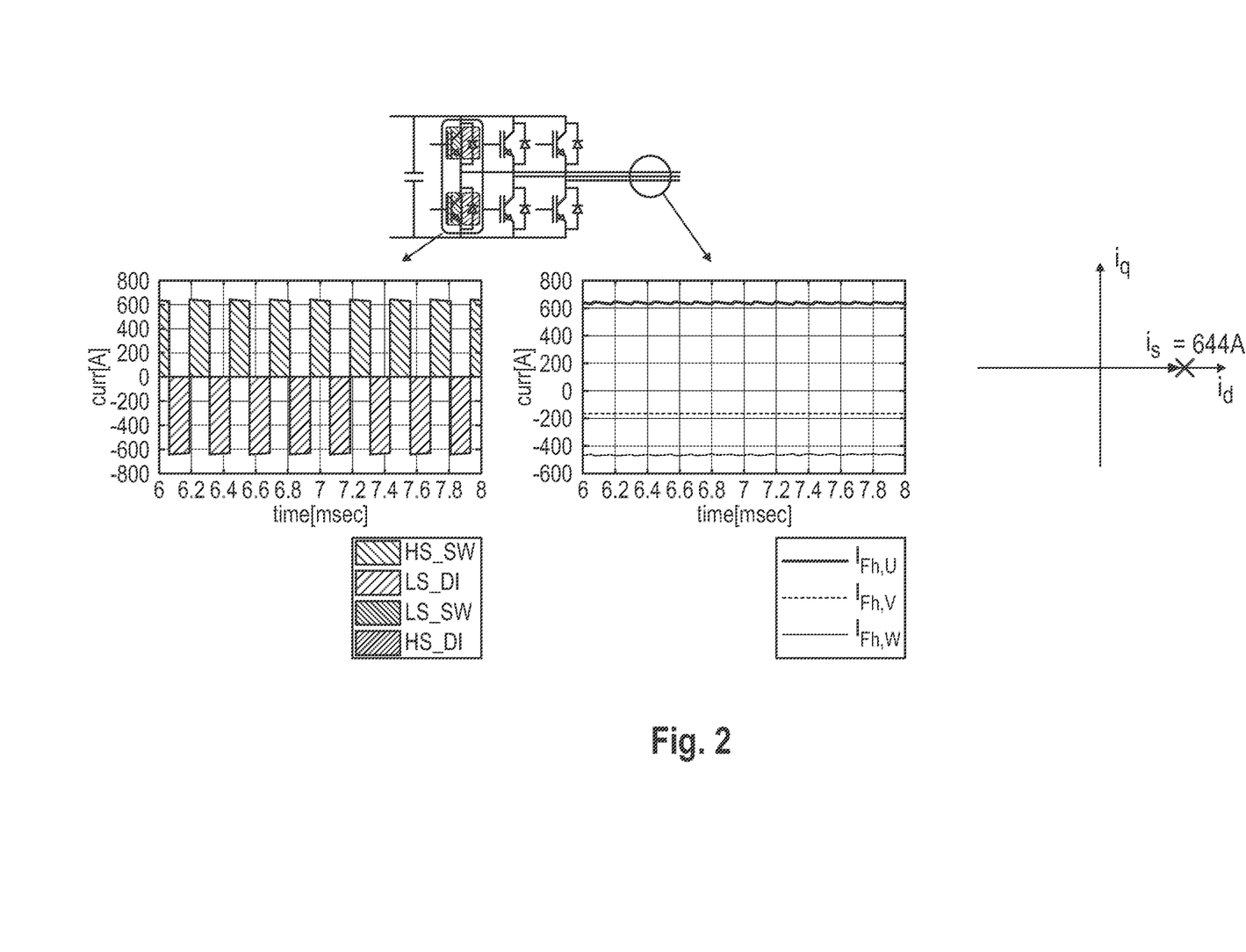
FIG. 2 shows a schematic depiction regarding operation of the electric motor to generate heat loss when the electric motor is at a standstill.
Figure 3:
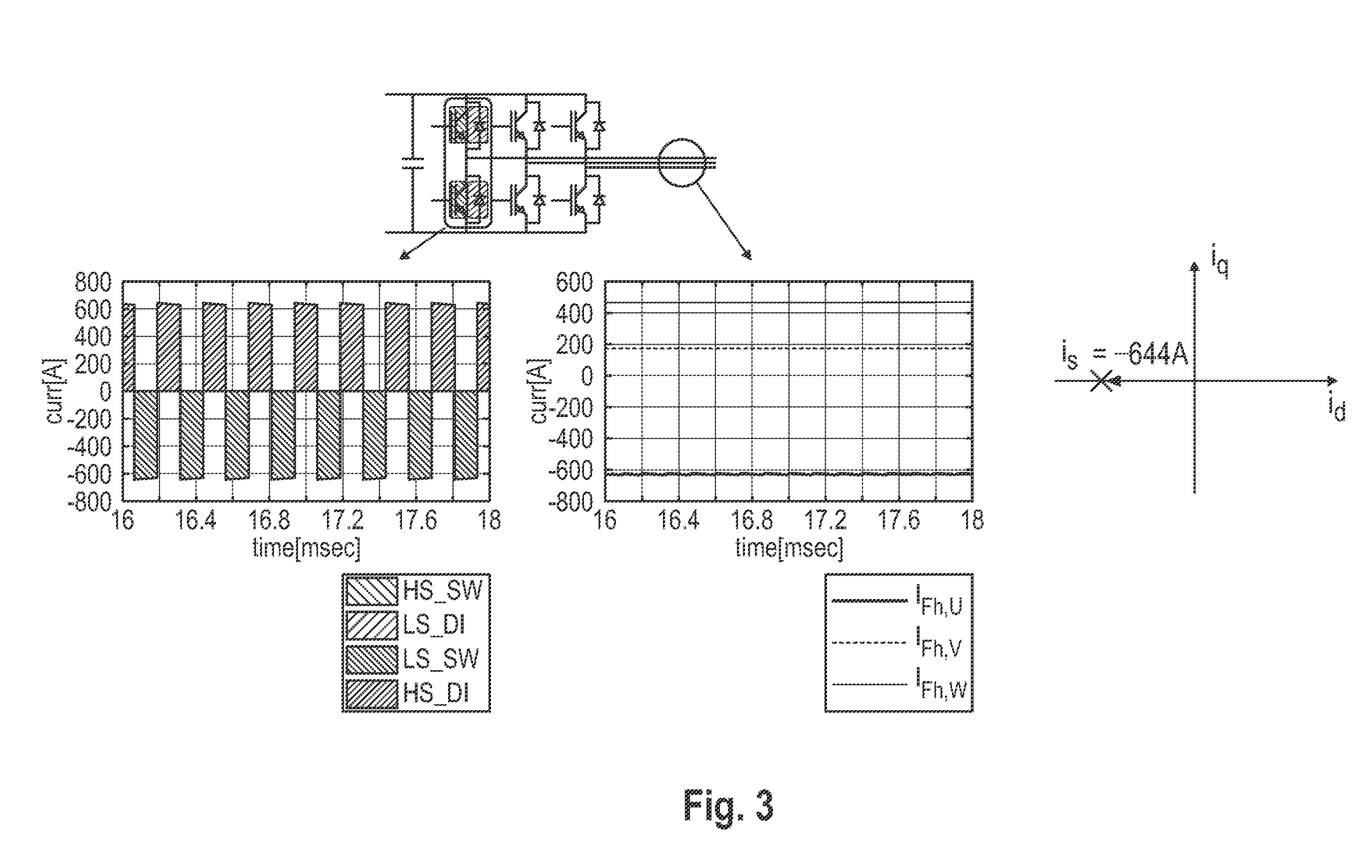
FIG. 3 shows a schematic depiction regarding operation of the electric motor in an alternative manner to generate heat loss when the electric motor is at a standstill.
Figure 4:
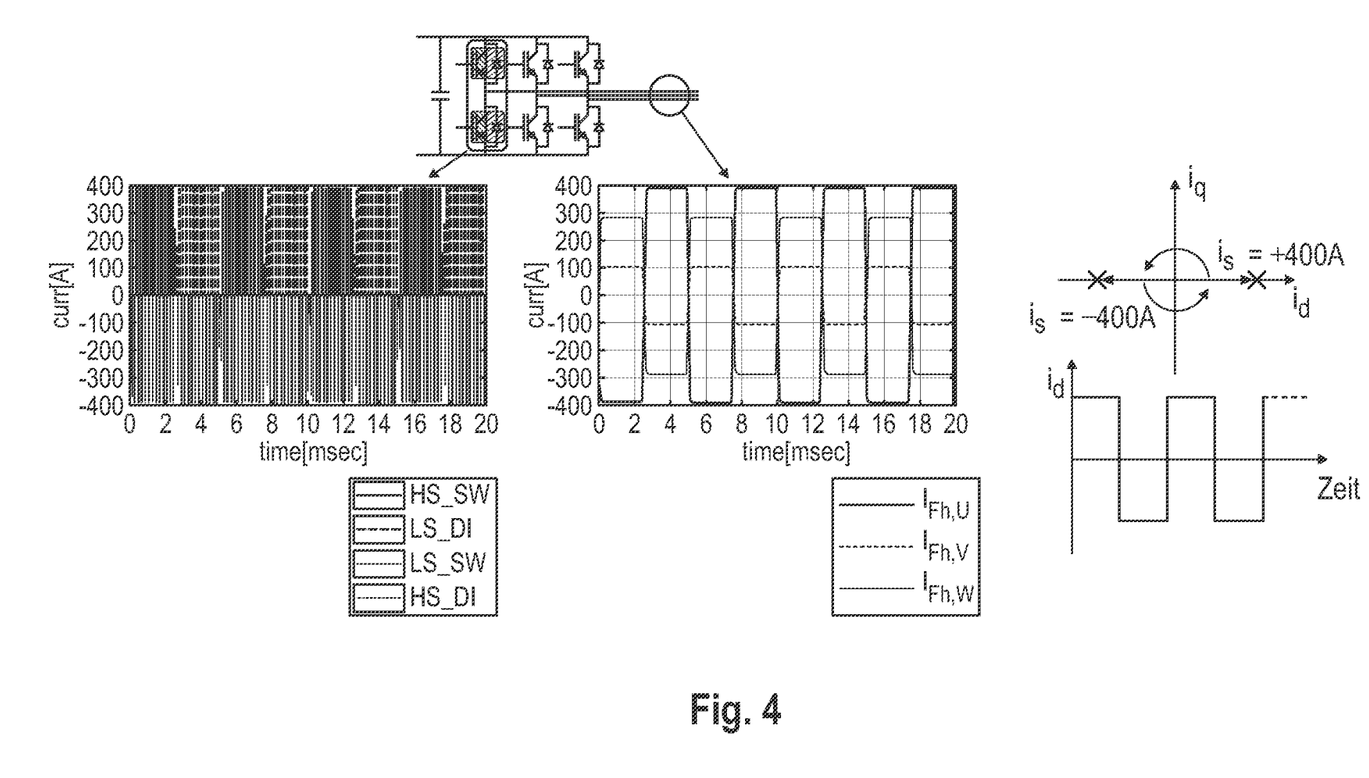
FIG. 4 shows a schematic depiction regarding operation of the electric motor in an alternative manner to generate heat loss when the electric motor is at a standstill.

FIGS. 2 to 4 show examples of such a modulation of the currents.

In FIG. 2, the high-side power transistor current is modulated in alternation with the low-side diode current as a square-wave signal, such that $I_q$=0 and Id is, for example, equal to 644 A. The currents $I_{PH,U}$, $I_{PH,V}$ and $I_{PH,W}$ of the phases U, V, W are correspondingly also shown. In this case, $I_{PH,U}$ is constantly positive at around 644 A, and the currents $I_{PH,V}$ and $I_{PH,W}$ are constant and negative at approximately −180 A and approximately −450 A, such that Iq=0 as a result, and $I_d$ is 644 A.

In FIG. 3, the low-side power transistor current is modulated in alternation with the high-side diode current as a square-wave signal, such that Iq=0 and Id is, for example, equal to −644 A. The currents $I_{PH,U}$, $I_{PH,V}$ and $I_{PH,W}$ of the phases U, V, W are correspondingly also shown. In this case, $I_{PH,U}$ is constantly negative at around −644 A, and the currents $I_{PH,V}$ and $I_{PH,W}$ are constant and positive at approximately 180 A and approximately 450 A, such that $I_q$=0 as a result, and $I_d$ is −644 A.

In FIG. 4, the low-side power transistor current is modulated in alternation with the high-side diode current as a higher-frequency square-wave signal, and this is effected in alternation with the high-side power transistor current being modulated in alternation with the low-side diode current as a higher-frequency square-wave signal, such that $I_q$=0 and $I_d$ alternates between +400 A and −400 A as a square-wave signal. The currents $I_{PH,U}$, $I_{PH,V}$ and $I_{PH,W}$ of the phases U, V, W are correspondingly also shown. Said currents are also in the form of corresponding square-wave signals, such that $I_q=0$ as a result, and $I_d$ jumps between +400 A and −400 A.

Figure 5:
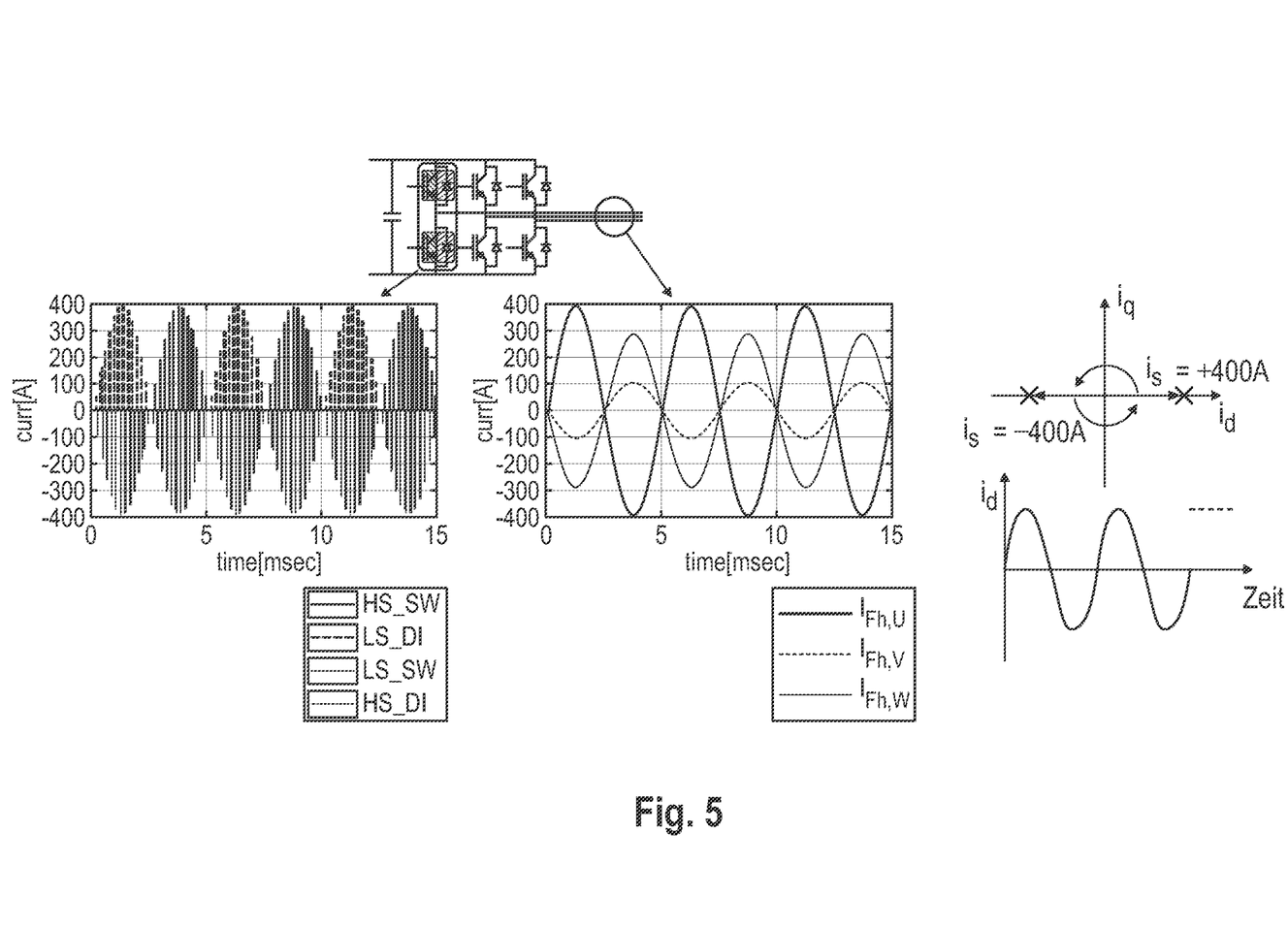
FIG. 5 shows a schematic depiction regarding operation of the electric motor in an alternative manner to generate heat loss when the electric motor is at a standstill.

In FIG. 5, the low-side power transistor current is modulated in alternation with the high-side diode current as a higher-frequency signal with a sinusoidal amplitude, and this is effected in alternation with the high-side power transistor current being modulated in alternation with the low-side diode current as a higher-frequency signal with a sinusoidal amplitude, such that $I_q=0$ and $I_d$ alternates between +400 A and −400 A as a sine-wave signal. The currents $I_{PH,U}$, $I_{PH,V}$ and $I_{PH,W}$ of the phases U, V, W are correspondingly also shown. Said currents are also in the form of corresponding sine-wave signals, such that $I_q=0$ as a result, and $I_d$ alternates sinusoidally between +400 A and −400 A.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Electric motor
2 High-voltage vehicle electrical system
3 Pulse-controlled inverter
4 Resistive component
5 Resistive component
6 Power switch module
7 High-side power switches/high-side power transistors
8 Low-side power switches/low-side power transistors
9 High-side diode
10 Low-side diode
11 IGBT power switch
12 Coolant circuit
13 Vehicle battery

The invention claimed is:

1. A method for heating a motor vehicle comprising a three-phase electric motor as a traction motor, the method comprising:

providing a pulse-controlled inverter for supplying power to the electric motor; and
providing a coolant circuit for cooling the electric motor and the pulse-controlled inverter using coolant, the coolant circuit using the coolant to supply heat to a heat exchanger for heating a passenger compartment and/or a vehicle battery,
generating heat loss by controlling a positive d current and negative d current in a d-axis of the electric motor while keeping the electric motor stationary, and introducing the heat loss into the coolant,
wherein generating the heat loss includes causing power losses from a winding of the electric motor and eddy current losses in laminations, and
wherein generating the heat loss includes causing heat loss in the pulse-controlled inverter generated as on-state losses from one or more power switches and freewheeling diodes.

2. The method as claimed in claim 1, wherein the electric motor is supplied with the d current in the d-axis and generates heat loss, which is used as waste heat, both in the electric motor and in the pulse-controlled inverter, and wherein a q current in a q-axis is equal to zero.

3. The method as claimed in claim 1, wherein as a result of the d current being set, no torque that could propel the motor vehicle is applied to one or more wheels of the motor vehicle.

4. The method as claimed in claim 1, wherein the heat loss from the electric motor is generated as as switching losses when one or more power switches are switched and losses in a DC-link capacitor during operation of the one or more power switches.

5. The method as claimed in claim 1, wherein the pulse-controlled inverter has an electronic circuit comprising power switches and freewheeling diodes, wherein a current through the power switches and the freewheeling diodes is modulated.

6. The method as claimed in claim 5, wherein the pulse-controlled inverter has high-side power transistors, low-side power transistors, high-side diodes and low-side diodes, wherein a first current through the high-side power transistors and the low-side diodes is controlled in a modulated manner and/or wherein a second current through the low-side power transistors and the high-side diodes is controlled in a modulated manner.

7. The method as claimed in claim 6, wherein the first current through the high-side power transistors and the low-side diodes and the second current through the low-side power transistors and the high-side diodes are pulse-modulated with a square-wave signal having a constant amplitude or a modulated amplitude.

8. A method for heating a motor vehicle comprising a three-phase electric motor as a traction motor, the method comprising:

providing a pulse-controlled inverter for supplying power to the electric motor; and
providing a coolant circuit for cooling the electric motor and the pulse-controlled inverter using coolant, the coolant circuit using the coolant to supply heat to a heat exchanger for heating a passenger compartment and/or a vehicle battery,
wherein when the electric motor is stationary, a positive d current and negative d current is controlled in a d-axis, with the result that heat loss is generated, the heat loss being introduced into the coolant,
wherein the electric motor is supplied with the d current in the d-axis and generates heat loss, which is used as waste heat, both in the electric motor and in the pulse-controlled inverter, and wherein a q current in a q-axis is equal to zero, wherein as a result of the d current being set, no torque that could propel the motor vehicle is applied to one or more wheels of the motor vehicle, and wherein controlling d current in the d-axis to generate heat loss includes causing power losses from a winding of the electric motor and eddy current losses in laminations, and causing heat loss in the pulse-controlled inverter generated as on-state losses from one or more power switches and freewheeling diodes.

\* \* \* \* \*